United States Patent [19]

Funahashi et al.

[11] Patent Number: 4,797,321

[45] Date of Patent: Jan. 10, 1989

[54] MAGNETIC RECORDING MEDIUM

[75] Inventors: Masaya Funahashi, Osaka; Teruhisa Miyata, Kyoto; Kenichi Inoue, Muko; Akira Miyake, Kyoto; Kohji Norimatsu, Fukuchiyama, all of Japan

[73] Assignee: Hitachi Maxell, Ltd., Osaka, Japan

[21] Appl. No.: 918,973

[22] Filed: Oct. 15, 1986

[30] Foreign Application Priority Data

Oct. 15, 1985 [JP] Japan .................. 60-230575

[51] Int. Cl.$^4$ ............................................. G11B 5/70
[52] U.S. Cl. .................................... 428/328; 428/329; 428/331; 428/336; 428/694; 428/695; 428/900
[58] Field of Search ............... 428/694, 695, 900, 323, 428/328, 329, 331, 336

[56] References Cited

U.S. PATENT DOCUMENTS

| | | | |
|---|---|---|---|
| 4,420,532 | 12/1983 | Yamaguchi et al. | 428/695 |
| 4,465,737 | 8/1984 | Miyatuka et al. | 428/695 |
| 4,546,038 | 10/1985 | Yamaguchi et al. | 428/695 |
| 4,554,220 | 11/1985 | Yamamoto et al. | 428/695 |
| 4,647,502 | 3/1987 | Miyake et al. | 428/695 |
| 4,647,503 | 3/1987 | Yamaguchi et al. | 428/695 |

*Primary Examiner*—Paul J. Thibodeau
*Attorney, Agent, or Firm*—Birch, Stewart, Kolasch & Birch

[57] ABSTRACT

A magnetic recording disc having a high durability and good electromagnetic conversion characteristics which comprises a non-magnetic support and a magnetic layer provided on at least one surface of the support, wherein the magnetic layer comprises magnetic powder, a resinous binder, polishing particles and a lubricating agent, characterized in that the polishing particles have a Mohs' scale of hardness of not less than 7 and an average particle size of 0.25 r to 0.75 r (r being the thickness (μm) of the magnetic layer) and the lubricating agent is a fatty acid ester having a melting point of not higher than 10° C.

17 Claims, No Drawings

MAGNETIC RECORDING MEDIUM

The present invention relates to a magnetic recording medium, and particularly to a magnetic recording disc, comprising a non-magnetic support and a magnetic layer provided on at least one surface of the support, said magnetic layer comprising magnetic powder and a resinous binder.

In comparison with a magnetic recording tape, a magnetic recording disc is apt to be worn away due to its sliding contact with a magnetic head under a high velocity during recording and reproducing, and development of a magnetic recording disc excellent in durability has been highly desired. For this purpose, it was already proposed to incorporate polishing particles (e.g. alpha-$Fe_2O_3$ having a relatively high Mohs' scale of hardness and a larger particle size than that of the magnetic powder or a lubricating agent such as a fatty acid, a fatty acid ester or liquid paraffin into the magnetic layer. In fact, the incorporation of said materials is surely effective in improvement of the durability and provides a magnetic recording disc having a sufficient durability from the practical viewpoint.

In recent years, however, the area where magnetic recording media are utilized is much expanded, and enhancement of recording density is highly desired. In this connection, it is demanded for a magnetic recording disc to decrease its thickness from a conventional range of 1.3 to 2.0 $\mu$m to 0.9 $\mu$m or less. Also, the circumstances under which magnetic recording media are used vary widely, and the occasion in which magnetic recording media are employed at lower temperatures under lower humidities are increased. When a magnetic recording disc is decreased in thickness or used at a low temperature under a low humidity, a satisfactory durability is hardly obtainable by the use of conventional polishing particles or lubricating agents as such. In addition, a magnetic recording disc comprising conventional polishing particles in the magnetic layer sometimes produces depression in the output of short wavelength and deterioration in electromagnetic conversion characteristics.

Aiming at providing a magnetic recording disc of high performance which maintains a satisfactory durability without deterioration of the electromagnetic conversion characteristics such as depression of the output of short wavelength even when the disc has a magnetic layer of a small thickness so as to meet the demand for high density recording or the disc is used under the circumstances of low temperatures and low humidities, an extensive study has been made.

In order to attain improvement of the durability of the magnetic layer to a high extent, the use of both polishing particles and a lubricating agent seems to be essential. When the polishing particles have a higher hardness or a larger particle size, a better durability is obtainable. However, in case of the particle size being too large, the polishing particles project at the surface of the magnetic layer so as to cause spacing loss between the magnetic layer and the magnetic head, whereby the output of short wavelength is lowered. Thus, the particle size of the polishing particles is required to be within a range acceptable for durability and electromagnetic conversion characteristics. On the other hand, the lubricating agent shows a suppressed behavior at low temperatures under low humidities and can hardly exert its lubricating effect at the surface of the magnetic layer. Thus, it will be necessary to select and use a lubricating agent that can easily transfer to the surface of the magnetic layer under said severe circumstances.

Based on the above considerations, various tests have been carried out on the hardness and particle size of the polishing particles as well as the kind and performances of the lubricating agent. As the result, it has now been found that the use of a combination of polishing particles having a higher hardness in comparison with that of conventional polishing particles, a particle size of a certain specific relationship to the thickness of the magnetic layer and, as a lubricating agent, a fatty acid ester having a certain specific melting point can attain the above noted aim.

According to the present invention, there is provided a magnetic recording disc which comprises a non-magnetic support and a magnetic layer on at least one surface of the non-magnetic support, wherein the magnetic layer comprises magnetic powder, a resinous binder, polishing particles having a Mohs' scale of hardness of not less than 7 and an average particle size of 0.25 r to 0.75 r (r being the thickness of the magnetic layer) and a fatty acid ester having a melting point of not higher than 10° C.

The non-magnetic support is usually shaped in the form of plate, sheet or film. Normally, it is made of an elastic polymeric material such as a polyester (e.g. polyethylene terephthalate, polyethylene-2,6-naphthalate), a polyolefin (e.g. polyethylene, polypropylene), a cellulose acetate (e.g. cellulose triacetate, cellulose diacetate), a polyimide or a polyamide. It may have a thickness of about 10 to 100 $\mu$m.

The magnetic layer(s) on one or both surfaces of the non-magnetic support comprise(s) magnetic powder, a resinous binder, polishing particles and a fatty acid ester. Examples of the magnetic powder are metal particles (e.g. metallic iron, metallic cobalt, iron or cobalt alloy), metal oxide particles (e.g. gamma-$Fe_2O_3$, $Fe_3O_4$, their intermediary oxides, their cobalt-modified products, barium ferrite, strontium ferrite), etc. The magnetic powder usually has an average particle size (longer axis) of about 0.1 to 0.4 $\mu$m. The amount of the magnetic powder in the magnetic layer may normally be from 50 to 90% by weight on the basis of the combined amount of the magnetic powder and the resinous binder.

Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, radioactive ray-curable resin, etc. A crosslinking agent such as a low molecular weight isocyanate compound may be optionally used in combination with them.

As stated above, it is characteristic in the magnetic recording disc of the invention that the magnetic layer comprises, as the essential components, certain specific polishing particles and a certain specific lubricating agent in addition to the magnetic powder and the resinous binder. As the polishing particles, there is used particles having a Mohs' scale of hardness of not less than 7, preferably of not less than 8. Examples of such polishing particles are alpha-$Al_2O_3$ (Mohs' scale of hardness, 9), $Cr_2O_3$ (Mohs' scale of hardness, 9), $SiO_2$ (Mohs' scale of hardness, 7), $ZrO_2$ (Mohs' scale of hardness, 8), SiC (Mohs' scale of hardness, 9), etc. When the polishing particles having a Mohs' scale of hardness of less than 7 such as alpha-Fe$_2$O$_3$ (Mohs' scale of hardness, 6) are used, a desired high durability can not be obtained. Further, the polishing particles to be used are required to have an average particle size within a certain range in relation to the thickness of the magnetic layer. Namely, they should have an average particle size of 0.25 r to 0.75 r, particularly of 0.30 r to 0.70 r, more particularly of 0.40 r to 0.65 r, the most particularly of 0.44 r to 0.56 r (r being the thickness of the magnetic layer). When the average particle size is less than the lower limit, enhancement of the durability is small. When the average particle size is more than the higher limit, a larger spacing loss is caused between the magnetic layer and the magnetic head by the projected polishing particles at the surface of the magnetic layer, whereby the output of short wavelength is lowered and good electromagnetic conversion characteristics are hardly obtained. Only when the average particle size is adjusted within the said range, are good results obtainable in both durability and electromagnetic conversion characteristics. The amount of the polishing particles may be usually from 0.1 to 30 parts by weight, preferably from 5 to 20 parts by weight, on the basis of 100 parts by weight of the magnetic powder. When the amount is less than the lower limit, the improvement in durability is small. When more than the upper limit, the electromagnetic conversion characteristics will be deteriorated.

As the lubricating agent, a fatty acid ester having a melting point of not higher than 10° C., preferably of not higher than 8° C., is usable. Examples of such fatty acid ester are n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, etc. These fatty acid esters can easily exude onto the surface of the magnetic layer upon the sliding contact between the magnetic layer and the magnetic head and even at low temperatures and under low humidities exert their lubricating activity effectively. The amount of the lubricating agent in the magnetic layer may be usually not less than 5 parts by weight, preferably from 6 to 20 parts by weight, on the basis of 100 parts by weight of the magnetic powder. In the case that the amount is less than said lower limit, the durability is deteriorated. If the amount is too much, excessive exudation takes place so that the magnetic head is stained and also the magnetic layer becomes too soft. These are unfavorable from the viewpoint of durability.

The magnetic coating composition may comprise additionally and optionally any other additives such as an antistatic agent or a surfactant. It may also comprise conventional polishing particles and/or lubricating agents other than those employed as the essential components in this invention.

For formation of the magnetic layer according to this invention, there may be adopted any per se conventional procedure. For instance, a magnetic coating composition comprising the magnetic powder, the resinous binder, the polishing particles and the lubricating agent dissolved or dispersed in an appropriate solvent (e.g. toluene, xylene, methyl ethyl ketone, cyclohexanone) is applied onto at least one surface of a non-magnetic support, followed by drying. Further, for instance, the magnetic coating composition as above but excluding the lubricating agent therefrom may be applied onto at least one surface of the non-magnetic support to make a magnetic layer, and then a solution of the lubricating agent is applied thereto. The resultant magnetic layer is then subjected to surface treatment (e.g. calendering) and punching process.

The thus formed magnetic layer has usually a thickness of about 0.3 to 2.5 μm. For high density magnetic recording, it is desirable to have a thickness of not more than 1.5 μm, particularly of not more than 1.1 μm, more particularly of not more than 0.9 μm, the most particularly of not more than 0.6 μm. Even when the thickness is so small as above, the magnetic layer can show high durability and good electromagnetic conversion characteristics by selecting an average particle size of the polishing particles within said range depending upon the thickness.

This invention can provide a magnetic recording disc enhanced in durability and excellent in electromagnetic conversion characteristics by the use of polishing particles having a certain specific hardness and an average particle size as defined above and a certain specific lubricating agent in the magnetic layer.

Practical and presently preferred embodiments of the invention are illustratively shown in the following examples wherein part(s) and % are by weight.

EXAMPLE 1

Onto each of both surfaces of a polyethylene terephthalate film of 75 μm in thickness, a magnetic coating composition comprising the following materials was applied, followed by drying to form a magnetic layer of 0.9 μm thick:

|  | Part(s) |
| --- | --- |
| Co-containing gamma-Fe$_2$O$_3$ powder | 1,000 |
| Carbon black | 150 |
| alpha-Al$_2$O$_3$ particles (Mohs' scale of hardness, 9; average particle size, 0.4 μm) | 100 |
| Nitrocellulose | 194 |
| Polyurethane | 117 |
| Trifunctional isocyanate compound "Coronate L" (Nippon Polyurethane Co.) | 78 |
| Cyclohexanone | 2,000 |
| Toluene | 2,000 |
| Oleyl oleate (M.P., lower than 6° C.) | 70 |

After calendering, said film having a magnetic layer on each surface was punched to make a magnetic recording disc having a diameter of 3.5 inches.

EXAMPLE 2

In the same manner as in Example 1 but using Cr$_2$O$_3$ particles (Mohs' scale of hardness, 9; average particle size, 0.5 μm) (100 parts) in place of alpha-Al$_2$O$_3$ particles, there was prepared a magnetic recording disc.

EXAMPLE 3

In the same manner as in Example 1 but using SiC particles (Mohs' scale of hardness, 9; average particle size, 0.63 μm) (100 parts) in place of alpha-Al$_2$O$_3$ particles, there was prepared a magnetic recording disc.

EXAMPLE 4

In the same manner as in Example 1 but using ZrO$_2$ particles (Mohs' scale of hardness, 8; average particle size, 0.27 μm) (100 parts) in place of alpha-Al$_2$O$_3$ particles, there was prepared a magnetic recording disc.

EXAMPLE 5

In the same manner as in Example 1 but using 2-ethylhexyl oleate (M.P., lower than 0° C.) (70 parts) in place of oleyl oleate, there was prepared a magnetic recording disc.

EXAMPLE 6

In the same manner as in Example 1 but adjusting the thickness of the magnetic layer to 0.6 μm and making the average particle size of alpha-Al$_2$O$_3$ particles 0.25 μm, there was prepared a magnetic recording disc.

COMPARATIVE EXAMPLE 1

In the same manner as in Example 1 but using alpha-Fe$_2$O$_3$ particles (Mohs' scale of hardness, 6; average particle size, 0.4 μm) (100 parts) in place of alpha-Al$_2$O$_3$ particles, there was prepared a magnetic recording disc.

COMPARATIVE EXAMPLE 2

In the same manner as in Example 1 but using alpha-Al$_2$O$_3$ particles (Mohs' scale of hardness, 9; average particle size, 0.8 μm) (100 parts) in place of alpha-Al$_2$O$_3$ particles (Mohs' scale of hardness, 9; average particle size, 0.4 μm), there was prepared a magnetic recording disc.

COMPARATIVE EXAMPLE 3

In the same manner as in Example 1 but using alpha-Al$_2$O$_3$ particles (Mohs' scale of hardness, 9; average particle size, 0.72 μm) (100 parts) in place of alpha-Al$_2$O$_3$ particles (Mohs' scale of hardness, 9; average particle size, 0.4 μm), there was prepared a magnetic recording disc.

COMPARATIVE EXAMPLE 4

In the same manner as in Example 1 but using alpha-Al$_2$O$_3$ particles (Mohs' scale of hardness, 9; average particle size, 0.1 μm) (100 parts) in place of alpha-Al$_2$O$_3$ particles (Mohs' scale of hardness, 9; average particle size, 0.4 μm), there was prepared a magnetic recording disc.

COMPARATIVE EXAMPLE 5

In the same manner as in Example 1 but using alpha-Al$_2$O$_3$ particles (Mohs' scale of hardness, 9; average particle size, 0.18 μm) (100 parts) in place of alpha-Al$_2$O$_3$ particles (Mohs' scale of hardness, 9; average particle size, 0.4 μm), there was prepared a magnetic recording disc.

COMPARATIVE EXAMPLE 6

In the same manner as in Example 1 but using n-butyl stearate (M.P., 27° C.) (70 parts) in place of oleyl oleate, there was prepared a magnetic recording disc.

COMPARATIVE EXAMPLE 7

In the same manner as in Example 1 but using methyl oleate (M.P., 20° C.) (70 parts) in place of oleyl oleate, there was prepared a magnetic recording disc.

COMPARATIVE EXAMPLE 8

In the same manner as in Example 6 but making the average particle size of alpha-Al$_2$O$_3$ particles 0.14 μm, there was prepared a magnetic recording disc.

With respect to each of the magnetic recording discs as prepared in Examples 1 to 5 and Comparative Examples 1 to 7, the recording-reproducing outputs at a linear recording density of 14KBPI were measured by the use of a floppy disc drive (3.5 inch, 1.6 M byte) manufactured by YE data. In the durability test, the running time during which the reproducing output at 10° C. under a 5% relative humidity reduced to 70% of the initial output was measured by the use of a floppy disc drive YD 645 (3.5 inch) manufactured by YE data. The obtained data are shown in Table 1 wherein a is the average particle size of the polishing particles and r is the thickness of the magnetic layer.

TABLE 1

| Example | Polishing particles | | | Lubricating agent | | Recording and reproducing output (dB) | Durability (Hrs) |
|---|---|---|---|---|---|---|---|
| | Kind | Mohs' scale of hardness | a/r | Kind | M.P. (°C.) | | |
| 1 | alpha-Al$_2$O$_3$ | 9 | 0.44 | Oleyl oleate | <6 | +1.2 | 1250 |
| 2 | Cr$_2$O$_3$ | 9 | 0.56 | Oleyl oleate | <6 | +1.0 | 1150 |
| 3 | SiC | 9 | 0.70 | Oleyl oleate | <6 | +0.8 | 1350 |
| 4 | ZrO$_2$ | 8 | 0.30 | Oleyl oleate | <6 | +1.2 | 1050 |
| 5 | alpha-Al$_2$O$_3$ | 9 | 0.44 | 2-Ethylhexyl oleate | 0 | +1.2 | 1300 |
| 6 | alpha-Al$_2$O$_3$ | 9 | 0.50 | Oleyl oleate | <6 | +1.2 | 1000 |
| Comparative | | | | | | | |
| 1 | alpha-Fe$_2$O$_3$ | 6 | 0.44 | Oleyl oleate | <6 | +1.2 | 20 |
| 2 | alpha-Al$_2$O$_3$ | 9 | 0.89 | Oleyl oleate | <6 | 0 | 1240 |
| 3 | alpha-Al$_2$O$_3$ | 9 | 0.80 | Oleyl oleate | <6 | +0.2 | 1120 |
| 4 | alpha-Al$_2$O$_3$ | 9 | 0.11 | Oleyl oleate | <6 | +1.3 | 560 |
| 5 | alpha-Al$_2$O$_3$ | 9 | 0.20 | Oleyl oleate | <6 | +1.2 | 620 |
| 6 | alpha-Al$_2$O$_3$ | 9 | 0.44 | n-Butyl stearate | 27 | +1.2 | 200 |
| 7 | alpha-Al$_2$O$_3$ | 9 | 0.44 | Methyl oleate | 20 | +1.2 | 280 |
| 8 | alpha-Al$_2$O$_3$ | 9 | 0.23 | Oleyl oleate | <6 | +1.2 | 400 |

What is claimed is:

1. A magnetic recording disc which comprises:
   a non-magnetic support and
   a magnetic layer provided on at least one surface of said support, wherein said magnetic layer has a thickness r of from 0.3 to 0.9 microns and comprises
   magnetic powder,
   a resinous binder,
   polishing particles having a Mohs' scale of hardness of not less than 7 and an average particle size of from 0.40 r to 0.65 r, wherein r is the thickness in microns of said magnetic layer, and a lubricating agent having a melting point of not higher than 10° C. which comprises a fatty acid ester selected from the group consisting of n-butyl oleate, hexyl oleate, n-octyl oleate, 2-ethylhexyl oleate oleyl oleate, n-butyl laurate, heptyl laurate, n-butyl myristate, n-butoxyehtyl oleate, and trimethylopropane trioleate.

2. The magnetic recording disc according to claim 1, wherein a magnetic layer is provided on both surfaces of said non-magnetic support.

3. The magnetic recording disc according to claim 1, wherein said polishing particles have an average particle size of from 0.44 r to 0.56 r.

4. The magnetic recording disc according to claim 1, wherein r is not more than 0.6 microns.

5. The magnetic recording disc according to claim 1, wherein said fatty acid ester is contained in said magnetic layer in an amount of not less than 5 parts by weight to 100 parts by weight of said magnetic powder.

6. The magnetic recording disc according to claim 1, wherein said magnetic powder has an average particle size of about 0.1 to 0.4 microns and is contained in an amount of from 50 to 90% by weight on the basis of the combined amount of said magnetic powder and said resinous binder.

7. The magnetic recording disc according to claim 1, wherein said polishing particles have a Mohs' scale of hardness of not less than 8.

8. The magnetic recording disc according to claim 1, wherein said polishing particles are contained in an amount of from 5 to 20 parts by weight on the basis of 100 parts by weight of said magnetic powder.

9. The magnetic recording disc according to claim 1, wherein said lubricating agent has a melting point of not higher than 8° C.

10. The magnetic recording disc according to claim 5, wherein said fatty acid ester is contained in said magnetic layer in an amount of from 6 to 20 parts by weight to 100 parts by weight of said magnetic powder.

11. The magnetic recording disc according to claim 1, wherein said polishing particles comprise a member selected from the group consisting of alpha-$Al_2O_3$, $Cr_2O_3$, $SiO2$, and $Zro_2$, SiC.

12. The magnetic recording disc according to claim 1, wherein said magnetic layer further comprises an antistatic agent, a surfactant, or both.

13. The magnetic recording disc according to claim 1, wherien said non-magnetic support has a thickness of from 10 to 100 microns and comprises a polymer selected from the group consisting of polyethylene terephthalate, polyethylene-2,6-naphtahalate, polyethylene, polypropylene, cellulose triacetate, cellulose diacetate, polyimide, and polamide.

14. The magnetic recording disc according to claim 1, wherein said magnetic powder comprises a member selected from the group consisting of iron, cobalt, an iron alloy, a cobalt alloy, gamma-$Fe_2O_3$, $Fe_3O_4$, barium ferrite, and strontium ferrite.

15. The magnetic recording disc according to claim 1, wherein said resinous binder comprises a member selected from the group consisting of vinyl chloride resin, vinyl acetate resin vinyl chloride/vinyl acetate copolymer, vinyl chloride/vinyl acetate/vinyl alcohol copolymer, polyurethane resin, cellulose resin, polyester resin on its sulfonated product, vinylidene chloride/acrylonitrile copolymer, acrylonitrile/butadiene copolymer, isoprene rubber, butadiene rubber, and radioactive ray-curable resin.

16. The magnetic recording disc according to claim 5, wherein said polishing particles are contained in an amount of from 5 to 20 parts by weight on the basis of 100 parts by weight of said magnetic powder.

17. The magnetic recording disc according to claim 16, wherein said magnetic powder has an average particle size of about 0.1 to 0.4 microns and is contained in an amount of from 50 to 90% by weight on the basis of the combined amount of said magnetic powder and said resinous binder.

* * * * *